United States Patent [19]
Oyamada

[11] Patent Number: 5,832,123
[45] Date of Patent: Nov. 3, 1998

[54] METHOD AND APPARATUS FOR PRODUCING AN ENHANCED TWO-GRAYSCALE IMAGE

[75] Inventor: Ouichi Oyamada, Tokyo, Japan

[73] Assignee: Kokusai Electric Co., Ltd., Tokyo, Japan

[21] Appl. No.: 754,326

[22] Filed: Nov. 21, 1996

[30] Foreign Application Priority Data

Nov. 24, 1995 [JP] Japan .................................. 7-306259

[51] Int. Cl.$^6$ .............................. G06K 9/44; G06T 3/40; H04N 1/40; H04N 1/409
[52] U.S. Cl. .......................... 382/237; 382/254; 382/264; 382/300; 382/270
[58] Field of Search ..................................... 382/264, 254, 382/237, 270, 279, 300, 298, 299; 358/447, 455, 456, 465, 466, 458, 451; 395/102

[56] References Cited

U.S. PATENT DOCUMENTS 5,123,082   6/1992   Shimada .................................. 395/102

FOREIGN PATENT DOCUMENTS

| | | |
|---|---|---|
| 61-63161 | 4/1986 | Japan . |
| 63-1160 | 1/1988 | Japan . |
| 4-8994 | 2/1992 | Japan . |
| 4-326671 | 11/1992 | Japan . |
| 5-145746 | 6/1993 | Japan . |
| 5-265439 | 10/1993 | Japan . |
| 6-141182 | 5/1994 | Japan . |
| 6-225151 | 8/1994 | Japan . |
| 8-116450 | 5/1996 | Japan . |

*Primary Examiner*—Scott Rogers
*Attorney, Agent, or Firm*—Jacobson, Price, Holman & Stern, PLLC

[57] ABSTRACT

An image enhancement method and an image enhancement apparatus is provided, wherein a multiple-gray-level converter of a grayscale converter converts an original two-grayscale image, an image enhancement device enhances the resultant image so that gray values for the outline of the image are smoothly changed, and a two-gray-level converter converts the enhanced image to a two-grayscale image by referring to a specific value that is set in advance. The image enhancement method and the image enhancement apparatus of the present invention resolve the conventional problem of jaggies that appear in the outline of an enhanced image and make the image appear unattractive, and they thus produce a high quality enhanced two-grayscale image that has a smoother outline.

17 Claims, 11 Drawing Sheets

FIG. 2

COLINEAR INTERPOLATION

● POINT TO BE INTERPOLATED

○ OBSERVATION POINT

FIG. 3

CUBIC CONVOLUTION INTERPOLATION

● POINT TO BE INTERPOLATED

○ OBSERVATION POINT

| 0.3 | 1.3 | 2.2 | 1.3 | 0.3 |
|---|---|---|---|---|
| 1.3 | 5.9 | 9.7 | 5.9 | 1.3 |
| 2.2 | 9.7 | 15.9 | 9.7 | 2.2 |
| 1.3 | 5.9 | 9.7 | 5.9 | 1.3 |
| 0.3 | 1.3 | 2.2 | 1.3 | 0.3 |

FIG. 10

ANTIALIASED PORTION

CHARACTER PORTION

ANTIALIASED PORTION

METHOD AND APPARATUS FOR PRODUCING AN ENHANCED TWO-GRAYSCALE IMAGE

BACKGROUND OF THE INVENTION

1. Field of the Invention

The present invention relates to an image enhancement method for a two-grayscale image that is employed for a facsimile, and an image enhancement apparatus; and in particular to an image enhancement method whereby a preferable enhanced two-grayscale image can be acquired, and an image enhancement apparatus therefor.

2. Description of the Related Art

According to a conventional two-grayscale image enhancement method used for a facsimile whereby an image is represented by two grayscale levels, enlargement of the pixels of an original image is performed.

Figure 12:
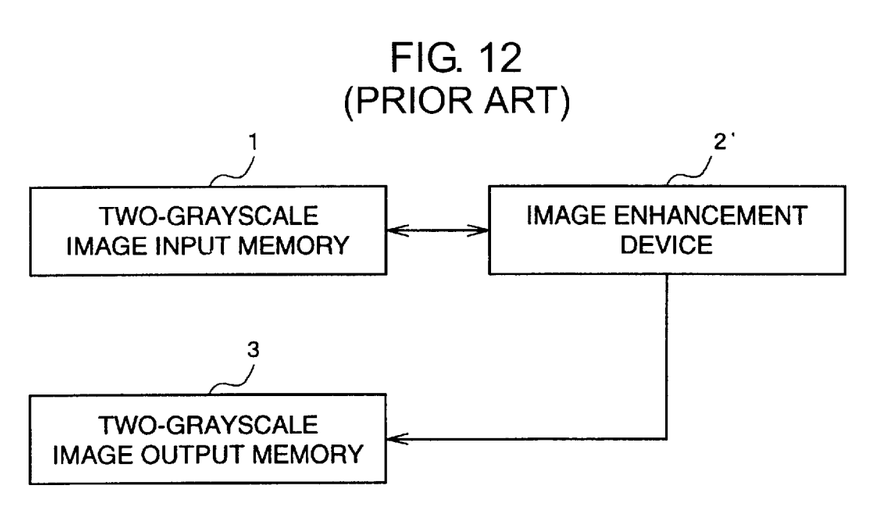
FIG. 12 is a block diagram illustrating a conventional image enhancement apparatus.

A conventional image enhancement apparatus will now be described while referring to FIG. 12. FIG. 12 is a block diagram illustrating a conventional image enhancement apparatus.

As is shown in FIG. 12, the conventional image enhancement apparatus comprises a two-grayscale image input memory 1, an image enhancement device 2' and a two-grayscale image output memory 3.

The individual sections of the conventional image enhancement apparatus will be specifically explained.

The two-grayscale image input memory 1 is a storage section wherein a gray value for a two-grayscale image before enhancement (original image) is stored.

The two-grayscale image output memory 3 is a storage section wherein a gray value for a two-grayscale image after being enhanced (an enhanced two-grayscale image) is stored.

The image enhancement device 2' enlarges a two-grayscale image. Specifically, the image enlargement device 2' reads a gray value from the two-grayscale image input memory 1, and enlarges pixels and stores their gray values in the two-grayscale image output memory 3.

To horizontally and vertically enlarge the pixels five times, for example, the gray level of a single pixel that is read from the two-grayscale image input memory 1 is enlarged to occupy a position in the two-grayscale image memory corresponding to a 5×5 pixel, and the result is stored in the memory 3.

Figure 13:
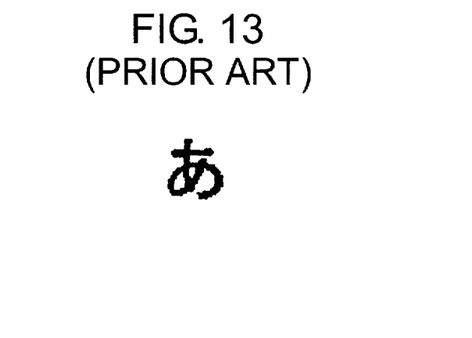
FIG. 13 is an explanatory diagram showing an example original image before being enhanced.
Figure 14:
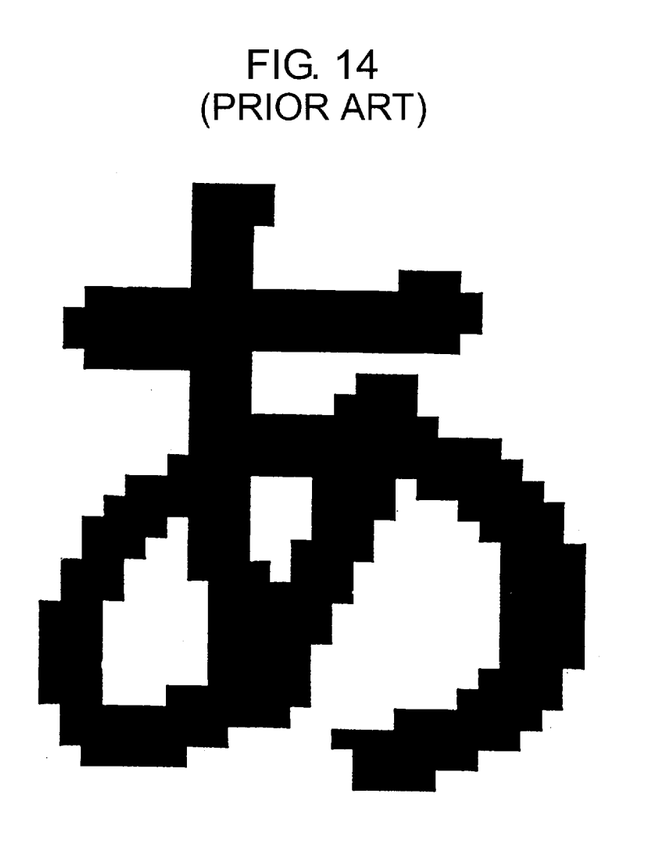
FIG. 14 is an explanatory diagram for an example enhanced two-grayscale image that is acquired by the conventional image enhancement apparatus.

As a result, an original image shown in FIG. 13 becomes an enhanced two-grayscale image, as is shown in FIG. 14. FIG. 13 is an explanatory diagram showing an example original image before being enlarged, and FIG. 14 is an explanatory diagram showing an enlarged two-grayscale image that is provided by the conventional image enhancement apparatus.

A problem, therefore, with the conventional image enhancement method and apparatus therefor is that the outline of an enhanced image has a jagged shape and an unattractive appearance.

Examples of such an image enhancement method and an image enhancement apparatus are described in Japanese Non-examined Patent Publication No.63-1160; 61-63161; 4-326671; 5-145746; 5-265439; 6-141182; 6-225151; 8-116450; and Japanese examined Patent Publication No.4-8994.

SUMMARY OF THE INVENTION

It is, therefore, one object of the present invention to provide an image enhancement method and an image enhancement apparatus that can produce a high quality enhanced two-grayscale image having a smooth outline.

To achieve the above object, according to the present invention, an image enhancement method comprises the steps of:

converting a two-grayscale image into a multi-grayscale image;

performing an enhancement process whereby gray values for an outline of the multi-grayscale image are smoothed, and creating an enhanced multi-grayscale image;

converting the gray values of the enhancement multi-grayscale image into two gray values by using a specific set value as a reference, thereby acquiring an enhanced two-grayscale image. In this manner, a high quality enhanced two-grayscale image that has a smooth outline can be obtained.

In the image enhancement method of the present invention, a low frequency element is extracted from the multi-grayscale image, and to create an enhanced multi-grayscale image, an enhancement process for smoothing the gray levels of the outline of the multi-grayscale image is performed. In this manner, a high quality enhanced two-grayscale image that has a smoother outline can be produced.

Further, in the image enhancement method of the present invention, a low frequency element is extracted from the enhanced multi-grayscale image, and gray values for the multi-grayscale image are converted to obtain two gray values, by using a specific set value as a reference, producing, thereby, an enhanced two-grayscale image. In this manner, a high quality enhanced two-grayscale image that has a smoother outline can be produced.

In the image enhancement method of the present invention, preferably, antialiasing is performed for the multi-grayscale image, and an enhancement process is performed to smooth gray levels for an outline of the resultant multi-grayscale image, thereby creating an enhanced multi-grayscale image. In this manner, a high quality enhanced two-grayscale image that has a smoother outline can be produced.

In the image enhancement method of the present invention, preferably, the set value is greater than a middle value in a gray scale in consonance with the degree of magnification, so that the black portion in an enhanced two-grayscale image is large and an image for which the degree of magnification is large can be easily identified.

In the image enhancement method of the present invention, since bilinear interpolation, cubic convolution interpolation or discrete cosine transformation is employed as the enhancement process for creating the enhanced multi-grayscale image from the multi-grayscale image, gray levels for the outline of the multi-grayscale image are smoothed to create the enhanced multi-grayscale image. From the enhanced multi-grayscale image, a high quality enhanced two-grayscale image that has a smooth outline can be produced.

Further, to achieve the above object, according to the present invention, an image enhancement apparatus comprises:

a two-grayscale image input memory in which a two-grayscale image is stored;

a multi-grayscale converter for converting gray values of the two-grayscale image into multiple gray values;

a multi-grayscale image input memory in which a multi-grayscale image composed of the multiple gray values is stored;

an image enhancement device for performing an enhancement process for smoothing gray values for an outline of the multi-grayscale image stored in the multi-grayscale image input memory to create an enhanced multi-grayscale image;

a multi-grayscale image output memory in which the enhanced multi-grayscale image is stored;

a two-gray-level converter for employing a set value as a reference to convert gray values of the enhanced multi-grayscale image, which is stored in the multi-grayscale image output memory, into two gray values; and a two-grayscale image output memory i n which is stored an enhanced two-grayscale image that is produced by the two-graylevel converter. In this manner, a high quality enhanced two-grayscale image having a smooth outline can be produced.

The image enhancement apparatus of the present invention further comprises: a low-pass filter for extracting a low frequency element from the multi-grayscale image that is stored in the multi-grayscale image input memory; and the image enhancement device performs the enhancement process for smoothing gray levels of an outline of an image having the low frequency element to create the enhanced multi-grayscale image. As a result, a high quality enhanced two-grayscale image that has a smoother outline can be produced.

Further, in the image enhancement apparatus of the present invention, the low-pass filter extracts a low frequency element from the enhanced multi-grayscale image that is obtained by the image enhancement device, and an image having the low frequency element is stored in the multi-grayscale image output memory. As a result, a high quality enhanced two-grayscale image that has a smoother outline can be produced.

In the image enhancement apparatus of the present invention, preferably, the low-pass filter is a Gaussian filter. With this filter, a high quality enhanced two-grayscale image that has a smoother outline can be produced.

Preferably, the image enhancement apparatus of the present invention further comprises an antialiasing device for performing an antialiasing process on the multi-grayscale image that is stored in the multi-grayscale image input memory. The image enhancement device performs the enhancement process for an enhanced multi-grayscale image that is obtained by the antialiasing process, so that gray levels for an outline of the enhanced multi-grayscale image are smoothed. As a result, a high quality enhanced two-grayscale image that has a smoother outline can be produced.

In the image enhancement apparatus of the present invention, preferably the image enhancement device employs the bilinear interpolation, the cubic convolution interpolation, or the discrete cosine transform. A multi-grayscale image is enhanced by smoothing gray levels for its outline, so that a high quality enhanced two-grayscale image that has a smoother outline can be produced.

According to the present invention, an image enhancement method comprises the steps of:

enhancing a two-grayscale image to create an enhanced two-grayscale image;

converting gray values of the enhanced two-grayscale image into multiple gray values to acquire an enhanced multi-grayscale image;

extracting a low frequency element from the enhanced multi-grayscale image; and converting gray values of an image of the low frequency element into two gray values by employing a specific set value as a reference to provide an enhanced two-grayscale image whose outline is smoothed. As a result, a high quality enhanced two-grayscale image that has a smoother outline can be produced.

According to the present invention, an image enhancement apparatus comprises:

a two-grayscale image input memory in which a two-grayscale image is stored; an image enhancement device for enhancing the two-grayscale image to provide an enhanced two-grayscale image;

a multiple-gray-level converter for converting gray values of the enhanced two-grayscale image into multiple gray values;

a multi-grayscale image input memory in which an enhanced multi-grayscale image is stored;

a low-pass filter for extracting a low frequency element from the enhanced multi-grayscale image;

a multi-grayscale image output memory in which is stored an image portion of the low frequency element of the enhanced multi-grayscale image;

a two-gray-level converter for referring to a set value as a reference for two-gray-level conversion to convert, into two gray values, gray values of the image portion of the low frequency element of the enhanced multi-grayscale image, which is stored in the multi-grayscale image output memory; and a two-grayscale image output memory in which is stored an enhanced two-grayscale image that is obtained by the two-gray-level converter. As a result, a high quality enhanced two-grayscale image that has a smoother outline can be produced.

<DESCRIPTION OF REFERENCE NUMERALS>

1: two-grayscale image input memory
2: image enhancement device;
3: two-grayscale image output memory
4: multi-grayscale image input memory
5: multi-grayscale image output memory
6: low-pass filter
7: antialiasing device
10: grayscale converter
11: multiple-gray-level converter
12: two-gray-level converter
12a: determination means
12b: set value area

DETAILED DESCRIPTION OF THE PREFERRED EMBODIMENTS

The preferred embodiments of the present invention will now be described while referring to the accompanying drawings.

According to a first image enhancement method of the present invention, an original two-grayscale image is first converted into a multi-grayscale image that has multiple gray values. Then, the multi-grayscale image is processed and enhanced so that the gray values for its outline are smoothly changed, and an enhanced multi-grayscale image is produced. The gray values of the enhanced multi-grayscale image are returned to two-grayscale values by using a specific value as a reference. As a result, a desired, enhanced two-grayscale image having a smooth outline can be produced.

Figure 1:
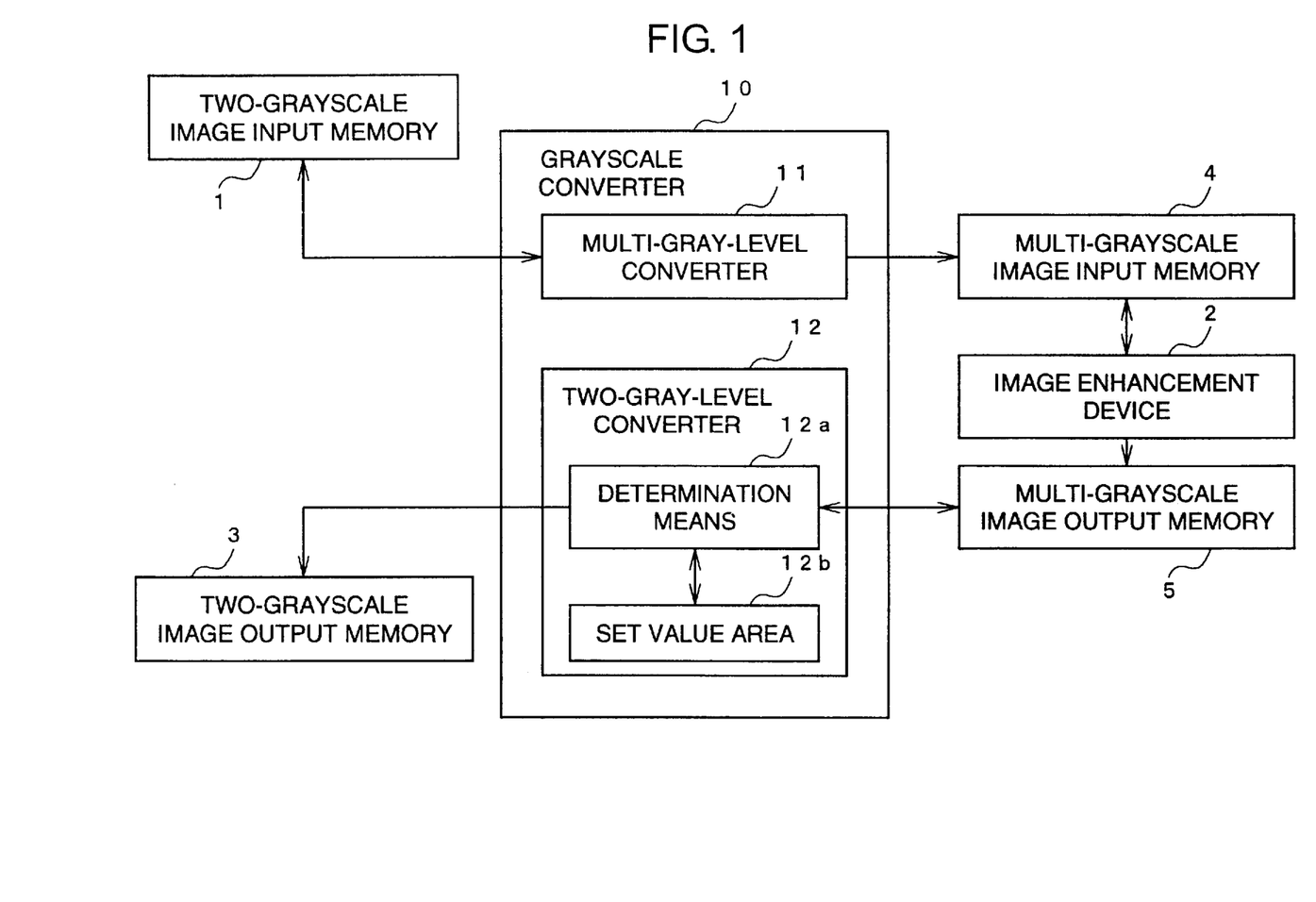
FIG. 1 is a block diagram illustrating the arrangement of an image enhancement apparatus according to a first embodiment of the present invention.

An explanation will now be given for the arrangement of an image enhancement apparatus according to a first embodiment (a first apparatus) that accomplishes the first image enhancement method of the present invention. FIG. 1 is a block diagram illustrating the arrangement of the first image enhancement apparatus according to the present invention. The same reference numerals as are used in FIG. 12 are also used in FIG. 1 and denote corresponding or identical components.

As is shown in FIG. 1, the first apparatus, as well as a conventional image enhancement apparatus, comprises a two-grayscale image input memory 1 and a two-grayscale image output memory 3. The first apparatus 1 further comprises, as the feature, an image enhancement device 2 that performs enhancement using a different method from does the conventional image enhancement device 2'; a grayscale converter 10, including a multiple-gray-level converter 11 and a two-grayscale level converter 12; a multi-grayscale image input memory 4; and a multi-grayscale image output memory 5.

The individual sections of the first apparatus will now be described, except for the two-grayscale image input memory 1 and the two-grayscale image output memory 3 that have the same structures as conventional memories.

The multi-grayscale image input memory 4 is a storage device in which stored are gray values for a multi-grayscale image that is obtained by converting the gray values of the original image into multiple gray values.

The multi-grayscale image output memory 5 is a storage device in which are stored gray values for an enhanced multi-grayscale image that is obtained by enhancing a multi-grayscale image stored in the multi-grayscale image input memory 4.

The two-grayscale image input memory 1 and the multi-grayscale image input memory 4 can be constituted by the same memory. Similarly, the two-grayscale image output memory 3 and the multi-grayscale image output memory 5 can be constructed by the same memory.

The grayscale converter 10 changes the grayscale of an image, and includes a multiple-gray-level converter 11, which changes the gray values of the original image from two gray values to multiple gray values; and the two-gray-level converter 12 that returns the gray values for an enhanced multi-grayscale image from multiple gray values to two gray values.

The multiple-gray-level converter 11 converts the two gray values of the original image, which are stored in the two-grayscale image input memory 1, into multiple gray values, and stores the multiple gray values in the multi-grayscale image input memory 4.

Assume that an original image with each bit represented by 2 grayscale levels is to be converted into an image with 8 bits for 256 grayscale levels. For a portion of the original image whose gray value is zero (black), the gray value is stored unchanged in the multi-grayscale image input memory 4. For a portion of the original image whose gray value is one (white), the gray value is converted into 255 and is stored the multi-grayscale image input memory 4.

The gray values of the enhanced multi-grayscale image, which is stored in the multi-grayscale image output memory 5, are converted to is (white) by the two-gray-level converter 12 when the gray values are equal to, or greater than, a specific value that has been set. When the gray values are lower than the set value, they are converted to 0s (black). In this manner, the gray values of the enhanced multi-grayscale image are returned to two gray levels, and are stored in the two-grayscale image output memory 3.

The set value is close to the middle value in a multi-grayscale that is obtained by multiple-gray-level conversion performed by the multiple-gray-level converter 11. When the set value is greater than the middle value, as the degree of enlargement for an image is increased, for the two-gray-level conversion the black areas are increased proportionally. That is, a character image, for example, is thickened and acquires a heavy appearance, so that it is easy to recognize.

When the degree of enlargement of an image is not so large, the set value is considerably nearer the middle value. For the two-gray-level conversion, the black areas are reduced proportionally, and a character image, for example, is thinned and is easy to distinguish.

As is shown in FIG. 1, the two-gray-level converter 12 includes a set value area 12b, in which a set value is stored; and determination means 12a for determining whether or not multiple gray values that are read from the multi-grayscale image output memory 5 are greater than the set value, and for converting the multiple gray values to two gray values.

The set value stored in the set value area 12b can be changed by external input means.

The specific processing performed by the two-gray-level converter 12 will be described. To re-form an enhanced multi-grayscale image of, for example, 256 gray levels for 8 bits as a two-grayscale image, the value 140, for example, which is near the middle value (128) for 256, is stored as a set value in the set value area 12b. The determination means 12a reads a gray value from the multi-grayscale image output memory 5. When the gray value is equal to or greater than the set value, 140, one (white) is stored in the two-grayscale image output memory 3. When the gray value is less than the set value, 0 (black) is stored in the two-grayscale image output memory 3.

The image enhancement device 2 so enhances a multi-grayscale image that the gray values for its outline are smoothly changed. Specific enhancement methods are a method using interpolation and a method using a discrete cosine transform (DCT).

According to the method using interpolation, before gray values for individual pixels of a multi-grayscale image are enhanced they are distributed to positions that are equidistantly located in consonance with the enlargement ratio. The gray values for pixels that are located between these positions are calculated by interpolation to create an enhanced multi-grayscale image.

Figure 2:
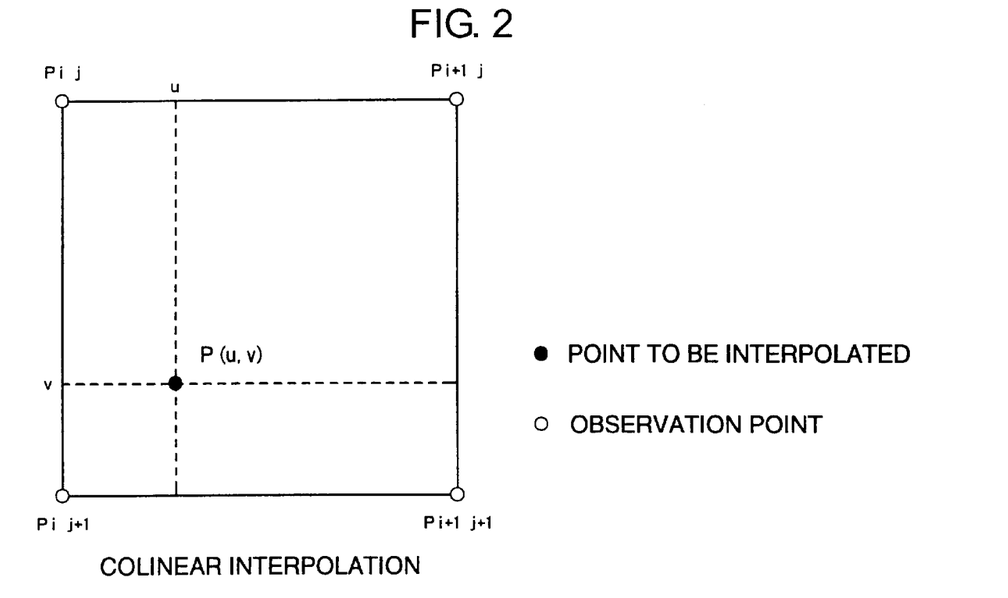
FIG. 2 is a diagram for explaining the bilinear interpolation.

As one of the interpolations that are generally known, bilinear interpolation will be briefly explained while referring to FIG. 2. FIG. 2 is a graph for explaining bilinear interpolation.

According to bilinear interpolation, as is shown in FIG. 2, gray value P(u, v), at point (u, v) for which interpolation is to be performed, is calculated using gray values $P_{ij}$, $P_{i+1j}$, $P_{ij+1}$ and $P_{i+1j+1}$, for four surrounding points (observation points) that are acquired in advance.

$$P = \{(i+1) - u)\}\{(j+1) - v\} P_{ij} + \quad \text{[Expression 1]}$$
$$\{(i+1) - u)\}\{v - j\} P_{ij+1} +$$
$$\{u - i\}\{(j+1) - v\} P_{i+1j} +$$
$$\{u - i\}\{v - j\} P_{i+1j+1}$$

$$\left. \begin{array}{l} i = [u] \\ j = [v] \end{array} \right\}$$

Figure 3:
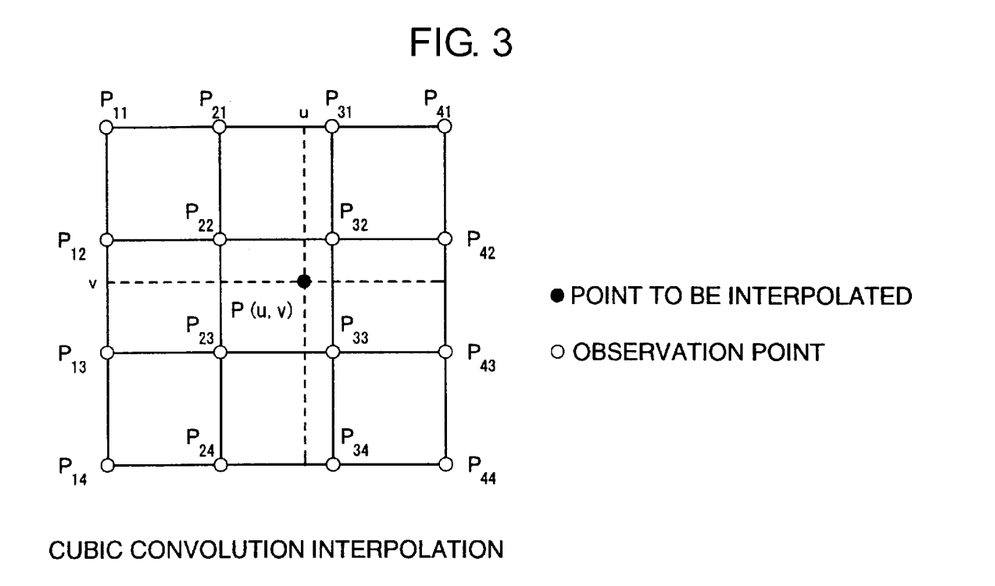
FIG. 3 is a diagram for explaining the cubic convolution interpolation.

As another interpolation method, cubic convolution interpolation will be described while referring to FIG. 3. FIG. 3 is an explanatory graph for cubic convolution interpolation.

According to the cubic convolution interpolation, as is shown in FIG. 3, gray value P(u,v), at point (u,v) for which interpolation is to be performed, is calculated using gray values P11 through P44, for sixteen surrounding points (observation points) that are acquired in advance.

$$P = [f(y_1) f(y_2) f(y_3) f(y_4)] \begin{bmatrix} P_{11} & P_{21} & P_{31} & P_{41} \\ P_{12} & P_{22} & P_{32} & P_{42} \\ P_{13} & P_{23} & P_{33} & P_{43} \\ P_{14} & P_{24} & P_{34} & P_{44} \end{bmatrix} \begin{bmatrix} f(x_1) \\ f(x_2) \\ f(x_3) \\ f(x_4) \end{bmatrix} \quad \text{[Expression 2]}$$

$$f(t) = \sin(\pi t)/(\pi t)$$

$$\approx \begin{cases} 1 - 2|t|^2 + |t|^3 & (0 \leq |t| < 1) \\ 4 - 8|t| + 5|t|^2 - |t|^3 & (1 \leq |t| < 2) \\ 0 & (2 \leq |t|) \end{cases}$$

$$\left. \begin{array}{ll} x_1 = 1 + (u - [u]) & y_1 = 1 + (v - [v]) \\ x_2 = (u - [u]) & y_2 = (v - [v]) \\ x_3 = 1 - (u - [u]) & y_3 = 1 - (v - [v]) \\ x_4 = 2 - (u - [u]) & y_4 = 2 - (v - [v]) \end{array} \right\}$$

Figure 4:
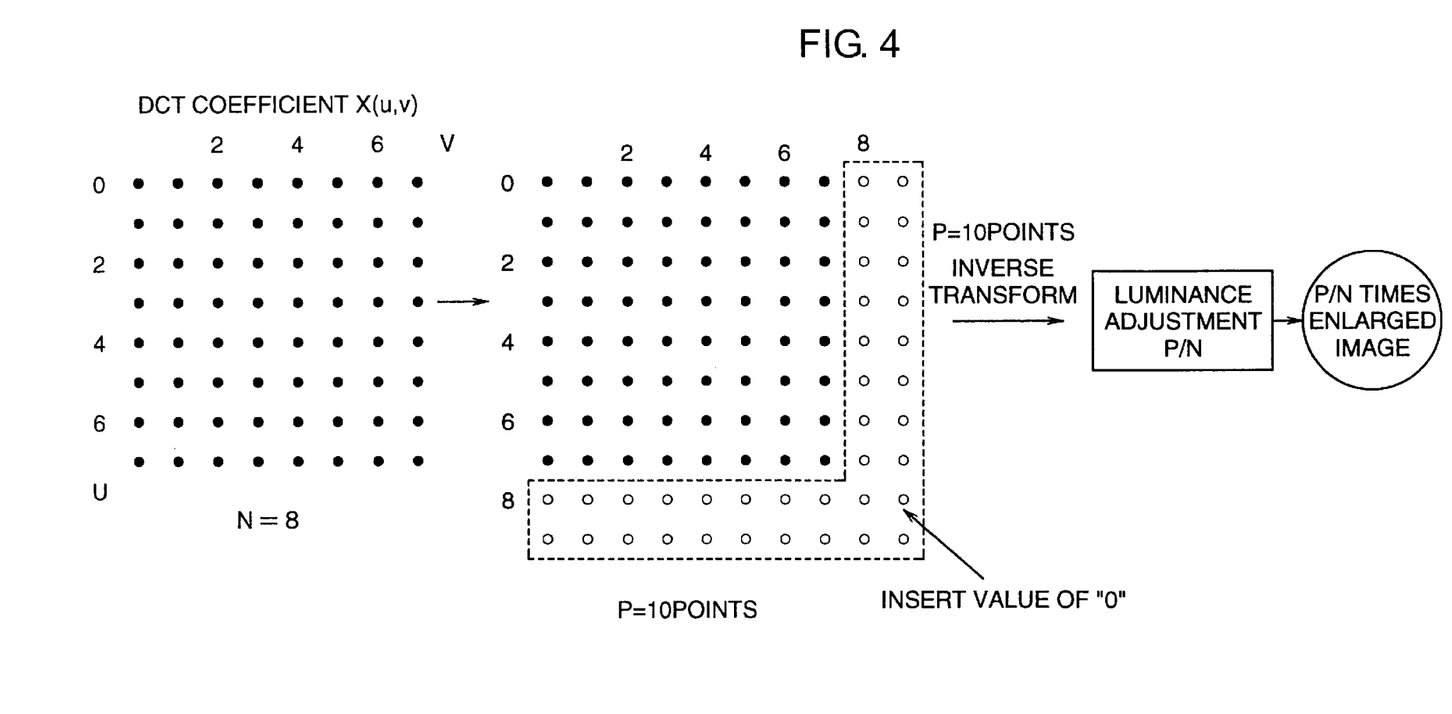
FIG. 4 is an explanatory diagram for image enhancement employing a DCT.

The image enhancement method using the DCT will be briefly explained while referring to FIG. 4. FIG. 4 is an explanatory diagram for the image enhancement method using the DOT.

According to the image enhancement method using the DCT, to enlarge an image P/N times (P>N), an original image is divided into N×N pixel blocks, and pixel values of 0 (zero) are inserted into a portion having a high frequency element to acquire a P×P DCT coefficient. An inverse discrete cosine transform is performed by using a P×P DCT coefficient to obtain an image of P×P pixels. Finally, individual pixel values are multiplied by P/N and luminance is increased, so that an image that is enlarged P/N times can be obtained.

As is shown in FIG. 4, when an image is enlarged 10/8 times, with P=10 and N=8, the 8×8 DCT coefficient that is obtained by the DCT conversion of 8×8 pixels is used to insert pixel values of 0 (zero) into a high frequency element portion (the coefficient is represented by the symbol o) that is enclosed by broken lines in FIG. 4. The inverse discrete cosine transform (simply referred to as "inverse conversion" in FIG. 4) is performed by using the 10×10 DCT coefficient to acquire an image of 10×10 pixels. Further, individual pixel values are multiplied by 10/8 and luminance is adjusted, so that the image that is enlarged 10/8 times can be provided.

The processing of the image enhancement apparatus according to the first embodiment of the present invention will now be described while referring to FIG. 1.

The first image enhancement apparatus stores two-grayscale values for an original image, such as a facsimile image, to the two-grayscale image input memory 1. The multi-level converter 11 in the grayscale converter 10 reads gray values from the two-grayscale image input memory 1 and converts them into multiple gray values, which are then stored in the multi-grayscale image input memory 4.

The image enhancement device 2 reads the multiple gray values for the original image from the multi-grayscale image input memory 4, enhances the image, and stores the multiple gray values for the enhanced image in the multi-grayscale image output memory 5.

The determination means 12a of the two-gray-level converter 12 in the grayscale converter 10 reads the multiple gray values for the enhanced image from the multi-grayscale image output memory 5. By referring to the set value that is stored in advance in the set value area 12b, the gray values that are read are converted into two gray values, which are stored in the two-grayscale image output memory 3.

Figure 5:
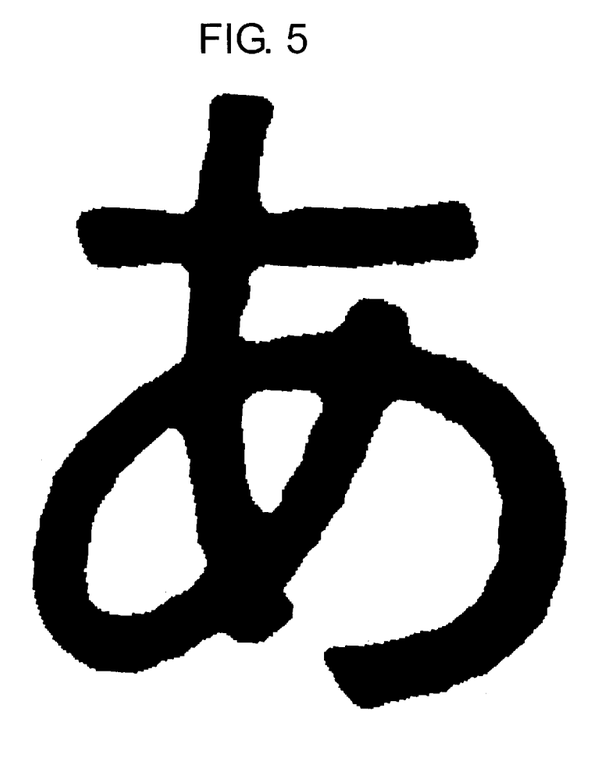
FIG. 5 is an explanatory diagram for an example enhanced two-grayscale image that is acquired by an image enhancement method according to the present invention.

Processing the original image shown in FIG. 13, for example, produces an enhanced two-grayscale image, as is shown in FIG. 5. FIG. 5 is an explanatory diagram for an enhanced two-grayscale image that is produced by the first image enhancement method according to the present invention.

In the first image enhancement apparatus of the present invention, an original two-grayscale image is changed to a multi-grayscale image by the multiple-gray-level converter 11 of the grayscale converter 10. The image enhancement device 2 enlarges the image in such a manner that the gray values for the outline of the image are smoothly changed. Then, the enhanced image is converted into a two-grayscale image by the two-graylevel converter 12 while referring to a reference value that is set in advance. The resultant image has a smooth outline. The first image enhancement apparatus thus effectively produces a high quality enhanced two-grayscale image.

Figure 6:
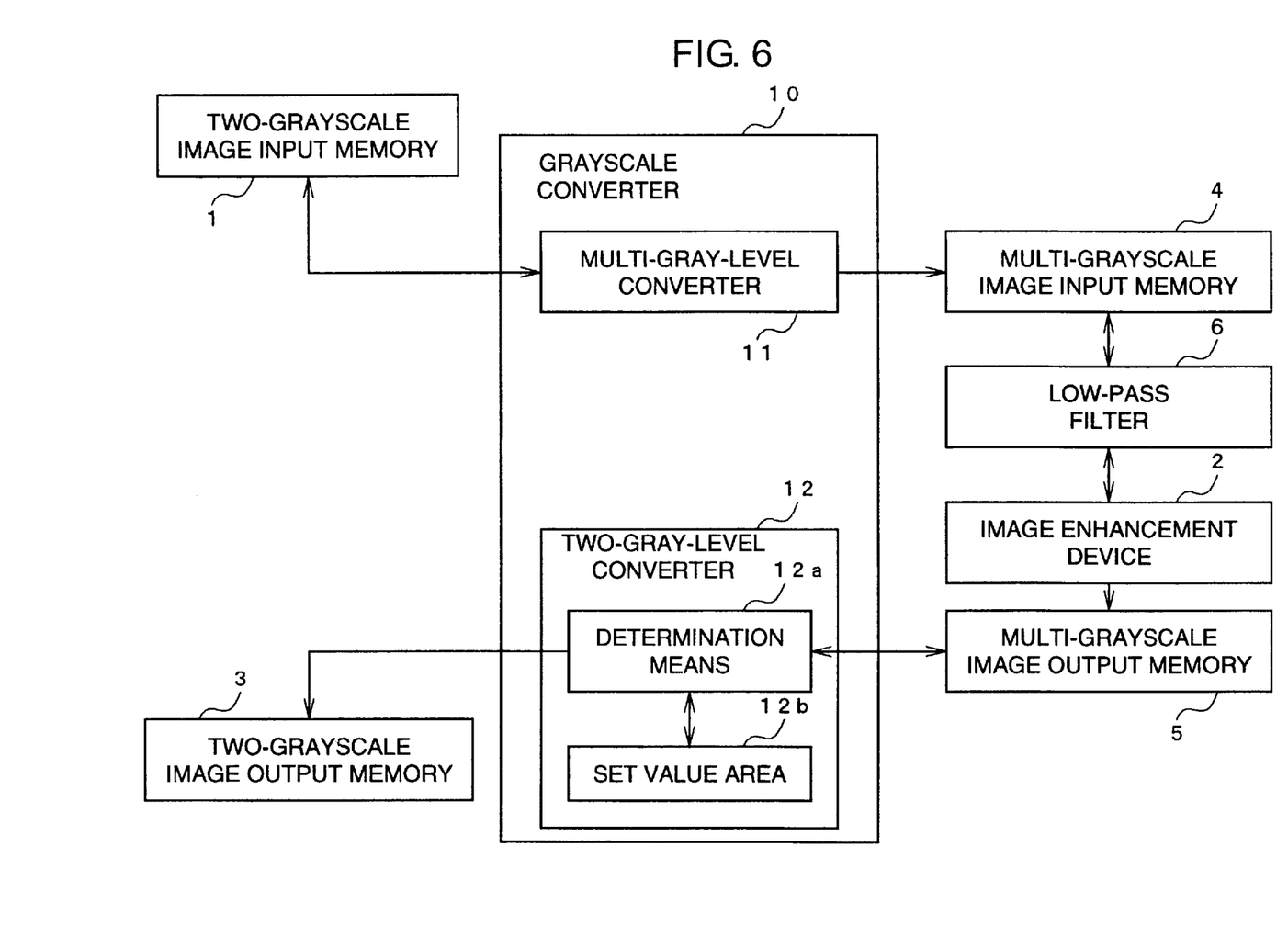
FIG. 6 is a block diagram illustrating an image enhancement apparatus according to a second embodiment of the present invention.

An explanation will now be given, while referring to FIG. 6, for an image enhancement apparatus (a second apparatus) according to a second embodiment that performs the first image enhancement method of the present invention. FIG. 6 is a block diagram illustrating the arrangement of the second image enhancement apparatus according to the present invention. The same reference numerals as are used in FIG. 1 are also used in FIG. 6 and denote corresponding or identical components.

As is shown in FIG. 6, in general the second apparatus comprises the same components as does the first image enhancement apparatus: a two-grayscale image input memory 1; a grayscale converter 10 which includes a multiple-gray-level converter 11 and a two-gray-level converter 12; a multi-grayscale image input memory 4; an image enhancement device 2; a multi-grayscale image output memory 5; and a two-grayscale image output memory 3. The second image enhancement apparatus additionally comprises a low-pass filter 6.

Only the sections that pertain to the feature of the second apparatus will now be described; no explanation will be given for the corresponding or identical components.

The low-pass filter 6 extracts low frequency elements from the values of pixels with which an image is constructed while eliminating high frequency elements, and provides a smooth image.

Although various methods for extracting low frequency elements for an image are known, a Gaussian filter that is based on the Gaussian distribution is employed for the present invention.

The two-dimensional Gaussian distribution with a standard division of σ is represented by Expression 3:

$$h(x,y) = \frac{1}{2\pi\sigma^2} \exp\left\{ -\frac{(x^2 + y^2)}{2\sigma^2} \right\}$$

Figure 7:
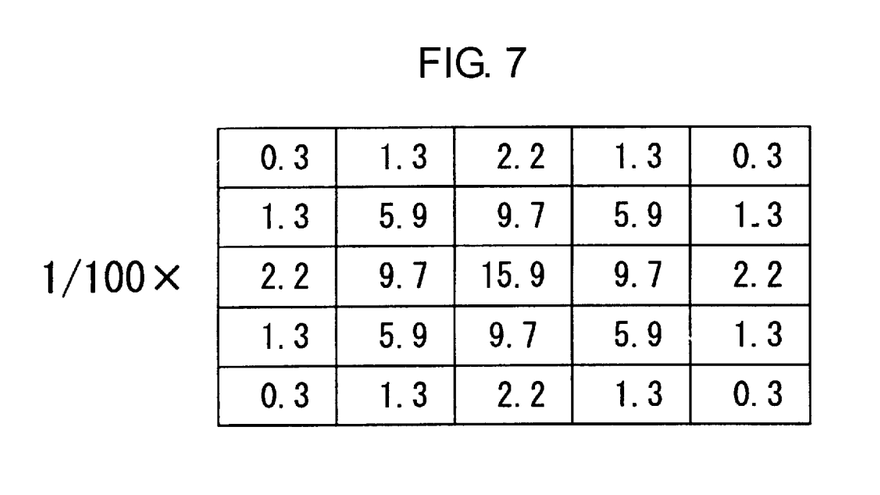
FIG. 7 is an explanatory diagram for an example low-pass filter that is employed for the image enhancement apparatus in the second embodiment.

The 5×5 Gaussian filter.6, with σ=1.0, shown in FIG. 7 is provided by substituting −2,−1, 0, 1 and 2 into x and y. FIG. 7 is an explanatory diagram showing an example low-pass filter 6 that is used in the second image enhancement apparatus. When the Gaussian filter is used as a low-pass, filter, a value for a specific pixel is multiplied by a filter distribution value; the same process is performed for the values of adjacent pixels. The obtained values are added together and a pixel value is acquired that is to be passed through a filter. Since the pixel value is too large, finally, it is multiplied by 1/100 to reduce it to a normal value.

Specifically, the low-pass filter 6 of the second apparatus multiples filter distribution values shown in FIG. 7 to obtain a multi-grayscale image that is stored in the multi-grayscale image input memory 4, so that an image from which a low frequency element is extracted is provided.

The processing performed by the second image enhancement apparatus of the present invention will be described while referring to FIG. 6.

In the second image enhancement apparatus, two gray values for an original image, such as a facsimile image, are stored in the two-grayscale image input memory 1. The multigray-level converter 11 in the grayscale converter 10 reads the gray values from the two-grayscale image input memory 1, converts them into multiple gray values, and stores the multiple gray values in the multi-grayscale image input memory 4.

The low-pass filter 6 reads the multiple gray values for the original image from the multi-grayscale image input memory 4 and extracts low frequency elements. Then, the image enhancement device 2 enhances the image and stores multiple gray values for the enhanced image in the multi-grayscale image output memory 5.

The determination means 12a of the two-gray-level converter 12 in the grayscale converter 10 reads multiple gray values for the enhanced image from the multi-grayscale image output memory 5. The gray values that are read are changed to two gray values by referring to the set value that is stored in advance in the set value area 12b, and the two gray values are stored in the two-grayscale image output memory 3.

According to the second image enhancement apparatus of the present invention, the original two-grayscale image is converted into a multi-grayscale image by the multiple-gray-converter 11 of the grayscale converter 10, and the low-pass filter 6 extracts low frequency elements to smooth the outline of the image. Following this, the image enhancement device 2 so enhances the image that the multiple gray values of the outline are smoothly changed, and the multiple gray values for the enhanced image are changed to two gray values by the two-gray-level converter 12 while referring to a value that is set in advance. The resultant image has a smooth outline. The second image enhancement apparatus thus effectively produces a high quality enhanced two-grayscale image.

Figure 8:
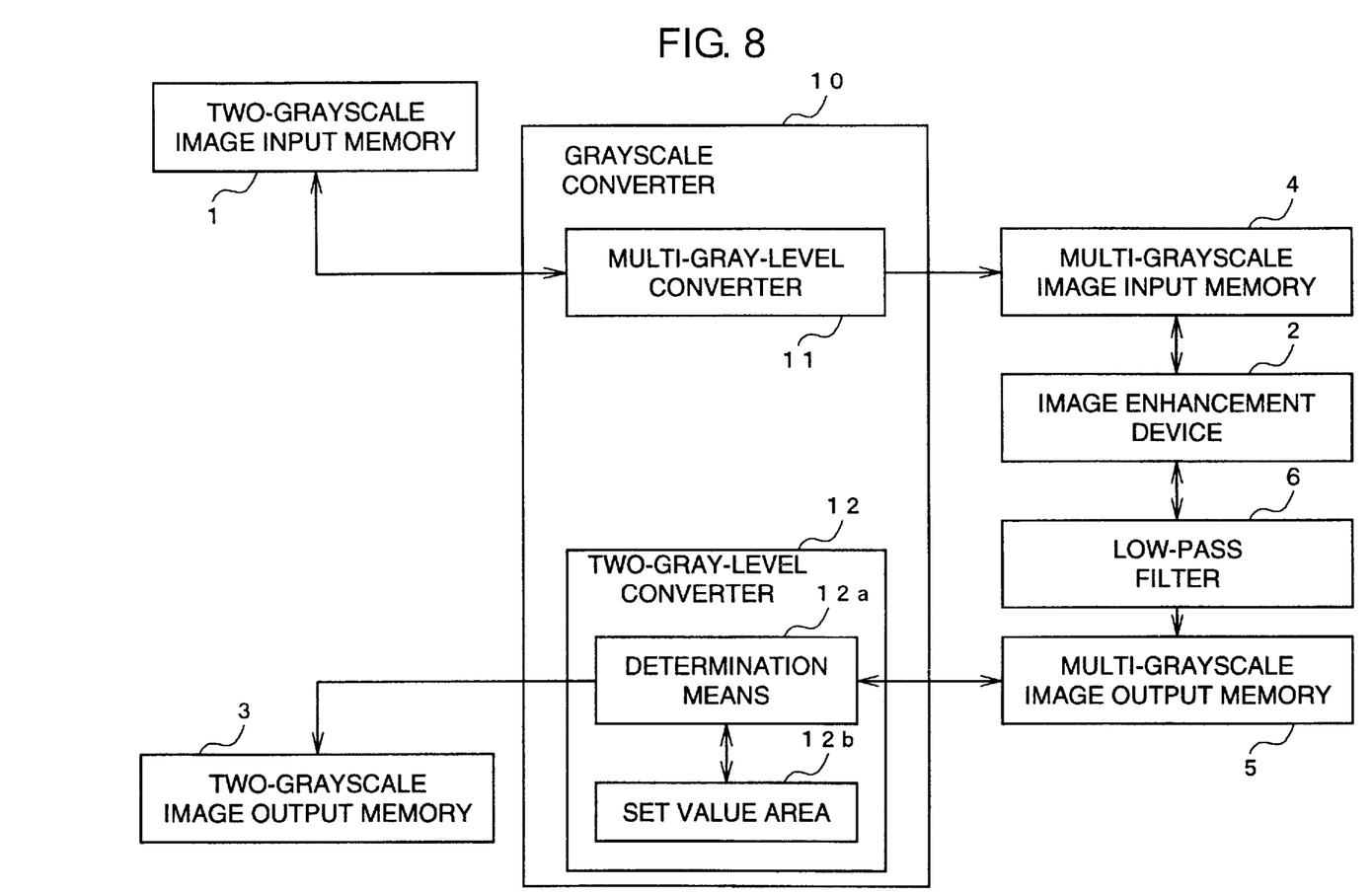
FIG. 8 is a block diagram illustrating an image enhancement apparatus according to a third embodiment of the present invention.

An explanation will now be given, while referring to FIG. 8, for an image enhancement apparatus (a third apparatus) according to a third embodiment that performs the first image enhancement method of the present invention. FIG. 8 is a block diagram illustrating the arrangement of the third image enhancement apparatus according to the present invention. The same reference numerals as are used in FIG. 6 are also used in FIG. 8 and denote corresponding or identical components.

As is shown in FIG. 8, the third apparatus comprises the same components as does the second image enhancement apparatus, with the exception that the order in which a low-pass filter 6 and an image enhancement device 2 are positioned is inverted relative to a multi-grayscale image input memory 4, in which is stored an image that is obtained by multi-grayscale conversion of the original image.

Since the individual sections function in the same manner as they do in the second embodiment, no explanation for them will be given.

The processing performed by the third image enhancement apparatus of the present invention will be described while referring to FIG. 8.

In the third image enhancement apparatus, two gray values for an original image, such as a facsimile image, are stored in the two-grayscale image input memory 1. The multiple-gray-level converter 11 in the grayscale converter 10 reads the gray values form the two-grayscale image input memory 1, converts them into multiple gray values, and stores the multiple gray values in the multi-grayscale image input memory 4.

The image enhancement device 2 reads the multiple gray values for the original image from the multi-grayscale image input memory 4 and enhances the image, and the low-pass filter 6 extracts low frequency elements from the enhanced image. Then, multiple gray values for the enhanced image are stored to the multi-grayscale image output memory 5.

The determination means 12a of the two-gray-level converter 12 in the grayscale converter 10 reads multiple gray values for the enhanced image from the multi-grayscale image output memory 5. The gray values that are read are changed to two gray values by referring to the set value that is stored in advance in the set value area 12b, and the two gray values are stored in the two-grayscale image output memory 3.

According to the third image enhancement apparatus of the present invention, the original two-grayscale image is converted into a multi-grayscale image by the multiple-gray-level converter 11 of the grayscale converter 10, and the image enhancement device 2 so enhances the image that the multiple gray values for the outline are smoothly changed. Following this, the low-pass filter 6 extracts low frequency elements to smooth the outline of the image, and the multiple gray values of the enhanced image are changed to two gray values by the two-gray-level converter 12 while referring to a value that is set in advance. The resultant image has a smooth outline. The third image enhancement apparatus thus effectively produces a high quality enhanced two-grayscale image.

Figure 9:
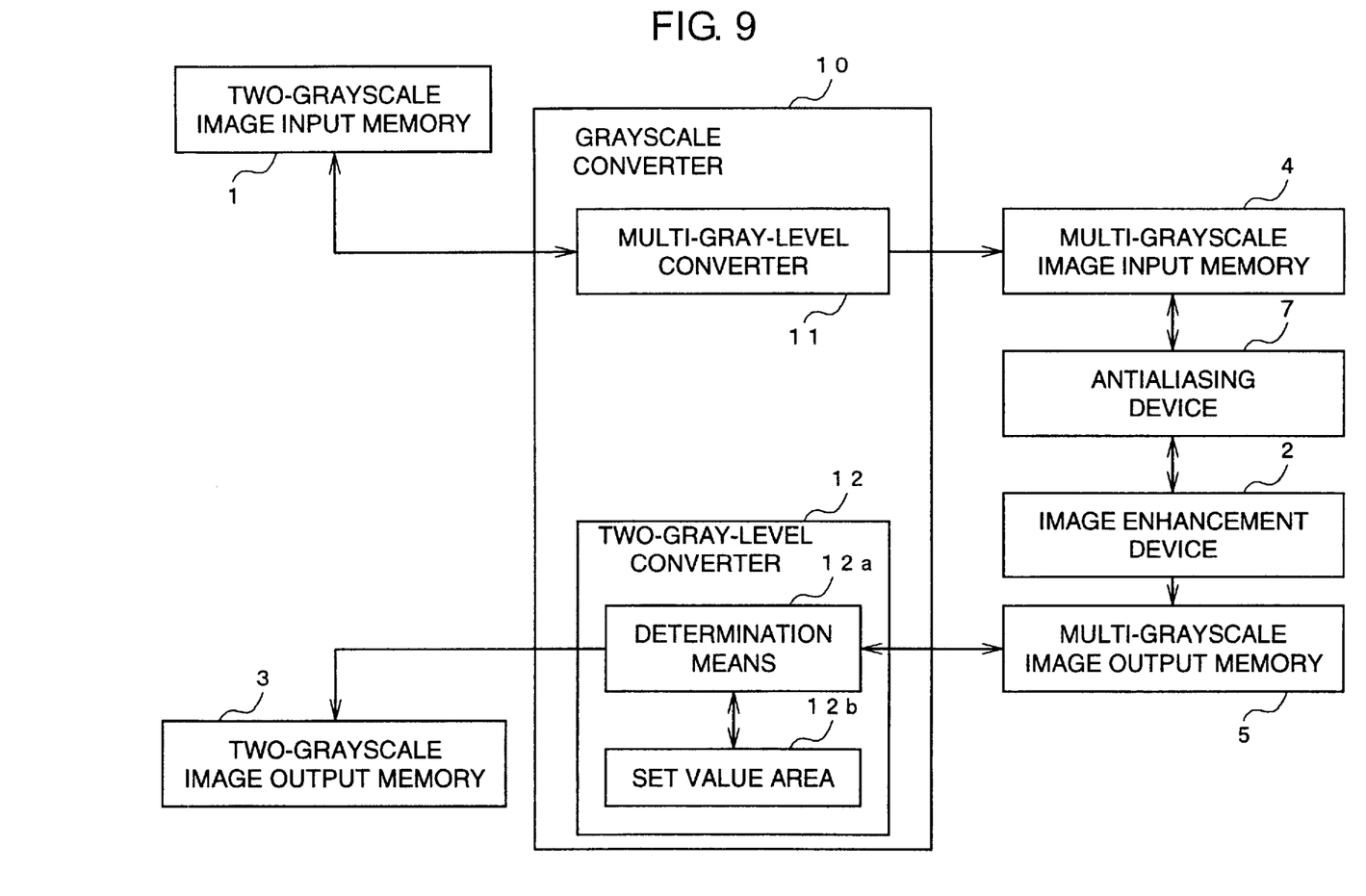
FIG. 9 is a block diagram illustrating an image enhancement apparatus according to a fourth embodiment of the present invention.

An explanation will now be given, while referring to FIG. 9, for an image enhancement apparatus (a fourth apparatus) according to a fourth embodiment that performs the first image enhancement method of the present invention. FIG. 9 is a block diagram illustrating the arrangement of the fourth image enhancement apparatus according to the present invention. The same reference numerals as are used in FIG. 1 are also used in FIG. 9 and denote corresponding or identical components.

As is shown in FIG. 9, in general the fourth apparatus comprises the same components as does the first image enhancement apparatus: a two-grayscale image input memory 1; a grayscale converter 10 which includes a multiple-gray-level converter 1 and a two-gray-level converter 12; a multi-grayscale image input memory 4; an image enhancement device 2; a multi-grayscale image output memory 5; and a two-grayscale image output memory 3. The fourth image enhancement apparatus, however, additionally comprises an antialiasing device 7.

Only the sections that pertain to the feature of the fourth apparatus will now be described and no explanation will be given for the corresponding or identical components.

The antialiasing device 7 smoothes or removes jaggies for a graphics element, such as a diagonal line, a curve or a circle in an image, to produce a smoother image. Specifically, as is shown in FIG. 10, antialiasing is performed on the jaggies at a boundary of a character and a background by replacing the gray values of a background with the middle gray value (e.g., the average gray value) of the gray values of the character and of the background.

Figure 10:
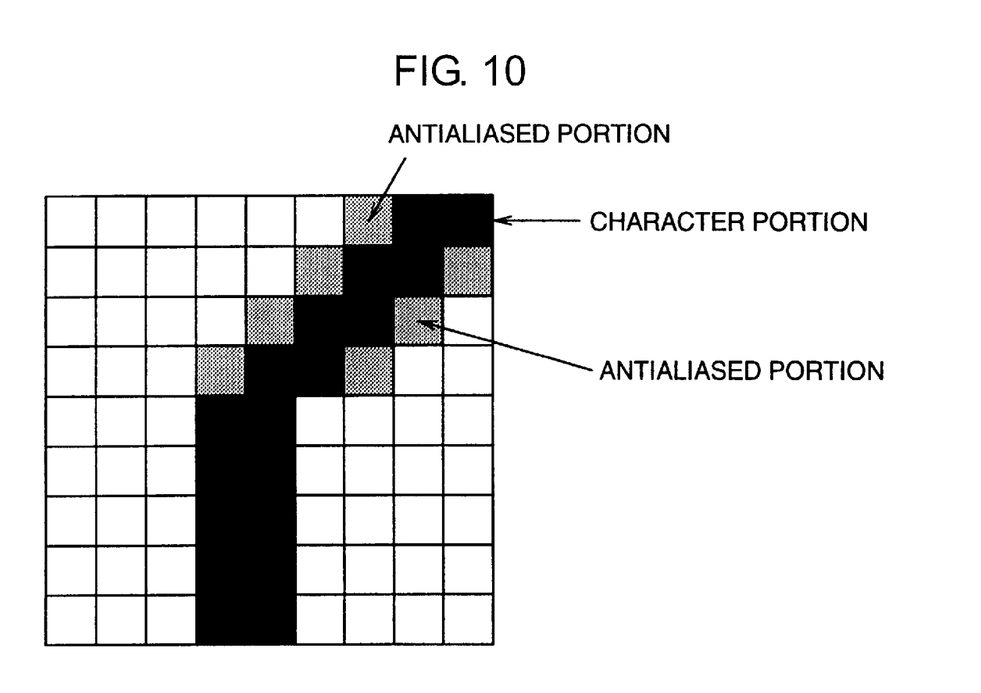
FIG. 10 is an explanatory diagram for an antialiasing method that is employed for the image enhancement apparatus according to the fourth embodiment.

FIG. 10 is an explanatory diagram for the antialiasing process that is performed by the fourth image enhancement apparatus. Although in FIG. 10 each region to be processed is represented by a single pixel that is adjacent to a character portion, the representation of such a region is not thereby so limited.

The processing performed by the fourth image enhancement apparatus of the present invention will be described while referring to FIG. 9.

In the fourth image enhancement apparatus, two gray values for an original image, such as a facsimile image, are stored in the two-grayscale image input memory 1. The multiple-gray-level converter 11 in the grayscale converter 10 reads the gray values from the two-grayscale image input memory 1, converts them into multiple gray values, and stores the multiple gray values in the multi-grayscale image input memory 4.

The antialiasing device 7 reads the multiple gray values for the original image from the multi-grayscale image input memory 4 and performs the antialiasing process to smooth jaggies. Then, the image enhancement device 2 enhances the image and stores multiple gray values for the enhanced image in the multi-grayscale image output memory 5.

The determination means 12a of the two-gray-level converter 12 in the grayscale converter 10 reads multiple gray values for the enhanced image from the multi-grayscale image output memory 5. The gray values that are read are changed to two gray values by referring to the set value that is stored in advance in the set value area 12b, and the two gray values are stored in the two-grayscale image output memory 3.

According to the fourth image enhancement apparatus of the present invention, the original two-grayscale image is converted into a multi-grayscale image by the multiple-gray-level converter 11 of the grayscale converter 10, and the antialiasing device 7 provides a smoother outline by smoothing jaggies. Following this, the image enhancement device 2 so enhances the image that the multiple gray values of the outline are smoothly changed, and the multiple gray values of the enhanced image are changed to two gray values by the two-gray-level converter 12 while referring to a value that is set in advance. The resultant image has a smooth outline. The fourth image enhancement apparatus thus effectively produces a high quality enhanced two-grayscale image.

A second image enhancement method according to the present invention will now be described.

According to the second image enhancement method of the present invention, first, a two-grayscale image is provided by merely enlarging an original image as in the conventional method. The two-grayscale enhanced image is converted into an enhanced multi-grayscale image that has multiple gray values. Low frequency elements are extracted from the multi-grayscale image to produce a smooth enhanced multi-grayscale image. The multiple gray values of the enhanced multi-grayscale image are reconverted to two gray values by referring to a value that is set in advance. With the second image enhancement method, a preferable enhanced two-grayscale image having a smooth outline can be produced.

Figure 11:
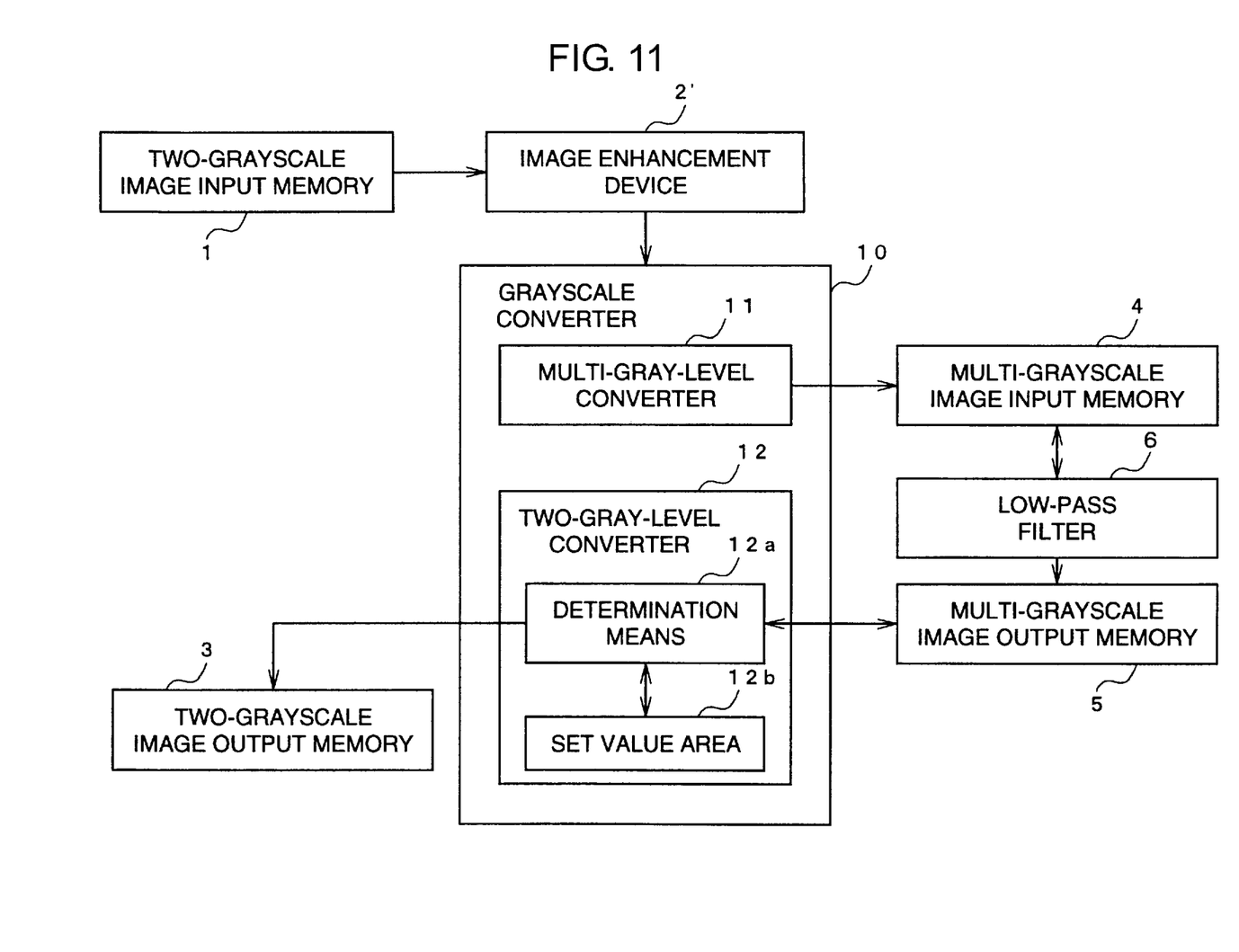
FIG. 11 is a block diagram illustrating an image enhancement apparatus according to a fifth embodiment of the present invention.

An explanation will now be given for the arrangement of an image enhancement apparatus according to a fifth embodiment (a fifth apparatus) that accomplishes the second image enhancement method of the present invention. FIG. 11 is a block diagram illustrating the arrangement of the fifth image enhancement apparatus according to the present invention. The same reference numerals as are used in FIG. 12 are also used in FIG. 11 and denote corresponding or identical components.

As is shown in FIG. 11, the fifth apparatus, as well as a conventional image enhancement apparatus, comprises a two-grayscale image input memory 1; an image enhancement device 2'; and a two-grayscale image output memory 3. Further, the fifth apparatus comprises, as well as the second apparatus, comprises as its features: a grayscale converter 10, which includes a multiple-gray-level converter 11 and a two-gray-level converter 12; a multi-grayscale image input memory 4; a low-pass filter 6; and a multi-grayscale image output memory 5.

The individual sections of the fifth apparatus are exactly the same as those of the conventional and the first and the second apparatuses, and no explanation for them will be given.

The processing performed by the fifth image enhancement apparatus of the present invention will be described while referring to FIG. 11.

In the fifth image enhancement apparatus, two gray values for an original image, such as a facsimile image, are stored in the two-grayscale image input memory 1. The image enhancement device 2' reads the gray values from the two-grayscale image input memory 1 and enhances their pixels. The multiple-gray-level converter 11 in the grayscale converter 10 converts the two gray values for the pixels into multiple gray values, and stores the multiple gray values in the multi-grayscale image input memory 4. Then, the low-pass filter 4 reads the gray values for the enhanced multi-grayscale image from the multi-grayscale image input memory 4, extracts low frequency elements, and stores them in the multi-grayscale image output memory 5.

The determination means 12a of the two-gray-level converter 12 in the grayscale converter 10 reads multiple gray values for the enhanced image from the multi-grayscale image output memory 5. The gray values that are read are changed to two gray values by referring to the set value that is stored in advance in the set value area 12b, and the two gray values are stored in the two-grayscale image output memory 3.

According to the fifth image enhancement apparatus of the present invention, the original two-grayscale image is enhanced by the conventional image enhancement device 2', the multiple-gray-level converter 11 of the grayscale converter 10 converts the enhanced two-grayscale image into a multi-grayscale image, and the low-pass filter 6 extracts low frequency element to smooth the outline. Following this, the multiple gray values for the enhanced image are changed to two gray values by the two-gray-level converter 12 while referring to a value that is set in advance. Even though the conventional image enhancement device 2' having a simple structure is employed, the resultant image has a smooth outline. The fifth image enhancement apparatus thus effectively produces a high quality enhanced two-grayscale image.

What is claimed is:

1. An image enhancement method comprising the steps of:
   converting gray values for a two-grayscale image into multiple gray values to produce a multi-grayscale image;
   performing an enhancement process whereby gray values for an outline of said multi-grayscale image are smoothed, and creating an enhanced multi-grayscale image;
   converting said gray values of said enhancement multi-grayscale image into two gray values by using a specific set value, which is variable and is set greater than a middle value in a gray scale in consonance with the degree of magnification as it increases. as a reference, thereby acquiring an enhanced two-grayscale image.

2. An image enhancement method according to claim 1, whereby a low frequency element is extracted from said multi-grayscale image, and whereby an enhancement process is performed of an image having said low frequency element so that said gray values for said outline is smoothed and an enhanced multi-grayscale image is produced.

3. An image enhancement method according to claim 1, whereby a low frequency element is extracted from said enhanced multi-grayscale image, and whereby gray values for an image having said low frequency element are converted to two gray values by using a specific set value as a reference, producing, thereby, an enhanced two-grayscale image.

4. An image enhancement method according to claim 1, whereby antialiasing is performed for said multi-grayscale image, and whereby an enhancement process is performed to smooth gray levels for an outline of the resultant multi-grayscale image, thereby creating an enhanced multi-grayscale image.

5. An image enhancement method according to claim 1, whereby bilinear interpolation is employed as said enhancement process for creating said enhanced multi-grayscale image from said multi-grayscale image.

6. An image enhancement method according to claim 1, whereby cubic convolution interpolation is employed as said enhancement process for creating said enhanced multi-grayscale image from said multi-grayscale image.

7. An image enhancement method according to claim 1, whereby discrete cosine transform is employed as said enhancement process for creating said enhanced multi-grayscale image from said multi-grayscale image. and increases luminance of individual pixel of obtained image in accordance with the degree of magnification.

8. An image enhancement apparatus comprising:
   a two-grayscale image input memory in which a two-grayscale image is stored;
   a multi-gray-level converter for converting gray values of said two-grayscale image into multiple gray values;
   a multi-grayscale image input memory in which a multi-grayscale image composed of said multiple gray values is stored;
   an image enhancement device for performing an enhancement process for smoothing gray values for an outline of said multi-grayscale image stored in said multi-grayscale image input memory to create an enhanced multi-grayscale image;
   a multi-grayscale image output memory in which is stored said enhanced multi-grayscale image that is produced by said image enhancement device;
   a two-gray-level converter for employing a set value. which is variable and is set greater than a middle value in a gray scale in consonance with the degree of magnification as it increases, as a reference to convert gray values of said enhanced multi-grayscale image, which is stored in said multi-grayscale image output memory, into two gray values; and
   a two-grayscale image output memory in which is stored an enhanced two-grayscale image that is produced by said two-gray-level converter.

9. An image enhancement apparatus according to claim 8, further comprising a low-pass filter for extracting a low frequency element from said multi-grayscale image that is stored in said multi-grayscale image input memory, wherein said image enhancement device performs said enhancement process for smoothing gray levels of an outline of an image having said low frequency element to create said enhanced multi-grayscale image.

10. An image enhancement apparatus according to claim 8, wherein said low-pass filter extracts a low frequency element from said enhanced multi-grayscale image that is obtained by said image enhancement device, and wherein an image having said low frequency element is stored in said multi-grayscale image output memory.

11. An image enhancement apparatus according to claim 9, wherein said low-pass filter is a Gaussian filter.

12. An image enhancement apparatus according to claim 8, further comprising an antialiasing device for performing an antialiasing process on said multi-grayscale image that is stored in said multi-grayscale image input memory, wherein said image enhancement device performs said enhancement process for an enhanced multi-grayscale image that is obtained by said antialiasing process, so that gray levels for an outline of said enhanced multi-grayscale image are smoothed.

13. An image enhancement apparatus according to claim 8, wherein bilinear interpolation is employed as said enhancement process for creating said enhanced multi-grayscale image from said multi-grayscale image.

14. An image enhancement apparatus according to claim 8, wherein cubic convolution interpolation is employed as said enhancement process for creating said enhanced multi-grayscale image from said multi-grayscale image.

15. An image enhancement apparatus according to claim 8, wherein discrete cosine transform is employed as said enhancement process for creating said enhanced multi-grayscale image from said multi-grayscale image, and increases luminance of individual pixel of obtained image in accordance with the degree of magnification.

16. An image enhancement method comprising the steps of:

enhancing a two-grayscale image to create an enhanced two-grayscale image;

converting gray values of said enhanced two-grayscale image into multiple gray values to acquire an enhanced multi-grayscale image;

extracting a low frequency element from said enhanced multi-grayscale image; and converting gray values of an image of said low frequency element into two gray values by employing a specific set value, which is variable and is set greater than a middle value in a gray scale in consonance with a degree of magnification as it increases, as a reference to provide an enhanced two-grayscale image whose outline is smoothed.

17. An image enhancement apparatus comprising:

a two-grayscale image input memory in which a two-grayscale image is stored;

an image enhancement device for enhancing said two-grayscale image to provide an enhanced two-grayscale image;

a multiple-gray-level converter for converting gray values of said enhanced two-grayscale image, which is produced by said image enhancement device, into multiple gray values;

a multi-grayscale image input memory in which is stored an enhanced multi-grayscale image that is provided by said multiple-gray-level converter;

a low-pass filter for extracting a low frequency element from said enhanced multi-grayscale image that is stored in said multiple-grayscale image input memory;

a multi-grayscale image output memory in which is stored an image portion of said low frequency element, of said enhanced multi-grayscale image, that has been extracted by said low-pass filter;

a two-gray-level converter for referring to a set value, which is variable and is set greater than a middle value in a gray scale in consonance with a degree of magnification as it increases, as a reference for two-gray-level conversion to convert, into two gray values, gray values of said image portion of said low frequency element of said enhanced multi-grayscale image, which is stored in said multi-grayscale image output memory; and a two-grayscale image output memory in which is stored an enhanced two-grayscale image that is obtained by said two-gray-level converter.

* * * * *